United States Patent
Saraswathi et al.

(10) Patent No.: US 9,382,843 B2
(45) Date of Patent: Jul. 5, 2016

(54) FLOW BALANCING VENTILATION SYSTEM AND METHOD OF BALANCING A FLOW

(71) Applicant: General Electric Company, Schenectady, NY (US)

(72) Inventors: Rajesh Prabhakaran Saraswathi, Karnataka (IN); Venkateswara Rao Akana, Karnataka (IN); Len Alan Wolf, Greenville, SC (US)

(73) Assignee: General Electric Company, Schenectady, NY (US)

( * ) Notice: Subject to any disclaimer, the term of this patent is extended or adjusted under 35 U.S.C. 154(b) by 898 days.

(21) Appl. No.: 13/646,944

(22) Filed: Oct. 8, 2012

(65) Prior Publication Data

US 2014/0099876 A1  Apr. 10, 2014

(51) Int. Cl.
*F24F 11/04* (2006.01)
*F02C 7/18* (2006.01)

(52) U.S. Cl.
CPC ............ *F02C 7/18* (2013.01); *F05D 2240/12* (2013.01); *F05D 2260/60* (2013.01); *F05D 2260/608* (2013.01); *Y10T 137/87812* (2015.04)

(58) Field of Classification Search
CPC ........ F24F 11/04; F02C 7/18; F05D 2240/12; F05D 2260/60; F05D 2260/608; F05D 2260/20; Y10T 137/87812
USPC ............................ 454/254, 335.341; 137/875
See application file for complete search history.

(56) References Cited

U.S. PATENT DOCUMENTS

| | | | | |
|---|---|---|---|---|
| 3,612,598 A | * | 10/1971 | Keslin et al. | ..................... 290/52 |
| 3,960,177 A | * | 6/1976 | Baumann | ................ F16K 1/222 |
| | | | | 137/625.31 |
| 5,151,063 A | * | 9/1992 | Tanaka et al. | .................. 454/258 |
| 5,737,911 A | * | 4/1998 | Hoizumi et al. | ................. 60/783 |
| 6,477,843 B2 | | 11/2002 | Schroeder et al. | |
| 6,982,607 B2 | | 1/2006 | Harron et al. | |
| 7,373,779 B2 | | 5/2008 | Czachor | |

FOREIGN PATENT DOCUMENTS

FR  2914401 A1  10/2008
WO  2010103184 A1  9/2010

OTHER PUBLICATIONS

Unofficial English translation of Chinese Office Action issued in connection with corresponding CN Application No. 201310464004.0 on Dec. 31, 2015.

* cited by examiner

*Primary Examiner* — Gregory Huson
*Assistant Examiner* — Dana Tighe
(74) *Attorney, Agent, or Firm* — Ernest G. Cusick; Hoffman Warnick LLC

(57) ABSTRACT

A flow balancing ventilation system includes a ventilation inlet for receiving an airflow, the ventilation inlet having a cavity defined by an outer wall. Also included is a plurality of ventilation ducts each having a first end and a second end, the first end of each of the plurality of ventilation ducts disposed in operable communication with the ventilation inlet for receiving the airflow, the second end of each of the plurality of ventilation ducts disposed at least partially within an enclosure. Further included is at least one vane disposed within the cavity of the ventilation inlet for manipulating the airflow proximate the first end of each of the plurality of ventilation ducts.

16 Claims, 3 Drawing Sheets

FLOW BALANCING VENTILATION SYSTEM AND METHOD OF BALANCING A FLOW

BACKGROUND OF THE INVENTION

The subject matter disclosed herein relates to ventilation systems, and more particularly to balancing a flow within such ventilation systems.

Ventilation systems are employed in a wide variety of applications for numerous purposes. One such application relates to turbine systems that include surrounding structures to provide an enclosure for turbine system components. The surrounding structures provide a buffer between the environment proximate the turbine system, thereby protecting the turbine system components from undesirable environmental impacts on the turbine system components and vice versa.

The ventilation system may be used in conjunction with the turbine system to provide an airflow, such as a cooling flow, to the enclosure defined by the surrounding structure housing the turbine system components. The airflow is often routed through a plurality of ducts to one or more enclosures, however, asymmetric flow characteristics between the plurality of ducts are commonly observed, thereby resulting in a deficiency or surplus of airflow to a particular duct and therefore a particular enclosure.

BRIEF DESCRIPTION OF THE INVENTION

According to one aspect of the invention, a flow balancing ventilation system includes a ventilation inlet for receiving an airflow, the ventilation inlet having a cavity defined by an outer wall. Also included is a plurality of ventilation ducts each having a first end and a second end, the first end of each of the plurality of ventilation ducts disposed in operable communication with the ventilation inlet for receiving the airflow, the second end of each of the plurality of ventilation ducts disposed at least partially within an enclosure. Further included is at least one vane disposed within the cavity of the ventilation inlet for manipulating the airflow proximate the first end of each of the plurality of ventilation ducts.

According to another aspect of the invention, a flow balancing ventilation system for a turbine system includes at least one turbine system component. Also included is a ventilation inlet for receiving an airflow, the ventilation inlet disposed at an exterior location of the at least one turbine system enclosure. Further included is a plurality of ventilation ducts each having a first end and a second end, the first end of each of the plurality of ventilation ducts disposed in operable communication with the ventilation inlet for receiving the airflow, the second end of each of the plurality of ventilation ducts disposed at least partially within the at least one turbine system enclosure. Yet further included is a first vane disposed within a cavity of the ventilation inlet, the cavity defined by an outer wall of the ventilation inlet. Also included is a second vane disposed within the cavity of the ventilation inlet.

According to yet another aspect of the invention, a method of balancing a flow within a ventilation system is provided. The method includes supplying an airflow to a ventilation inlet. Also included is manipulating the airflow within a cavity of the ventilation inlet with at least one vane. Further included is routing the airflow from the ventilation inlet through a plurality of ventilation ducts to an enclosure.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
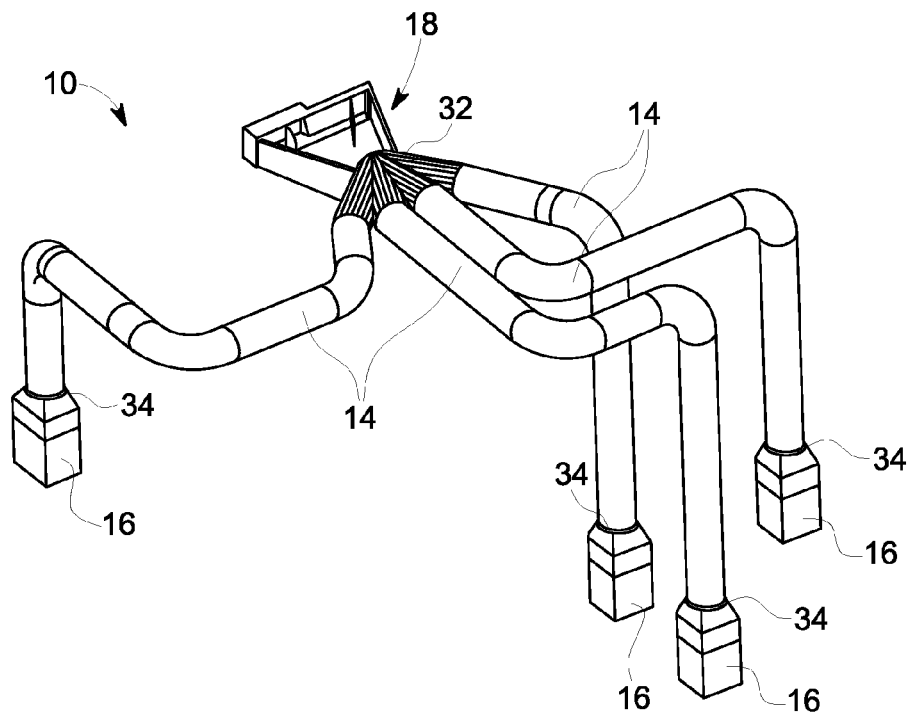
FIG. 1 is a perspective view of a flow balancing ventilation system.
Figure 2:
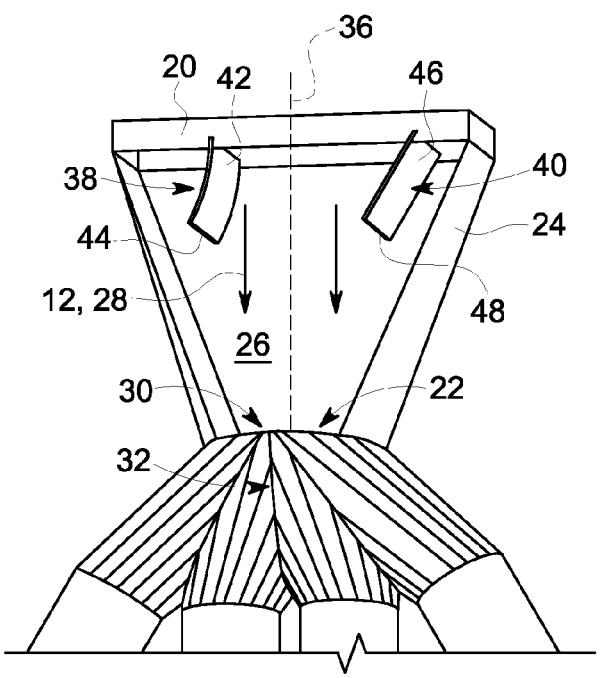
FIG. 2 is an enlarged view of section II of FIG. 1, illustrating a ventilation inlet of the flow balancing ventilation system.
Figure 6:
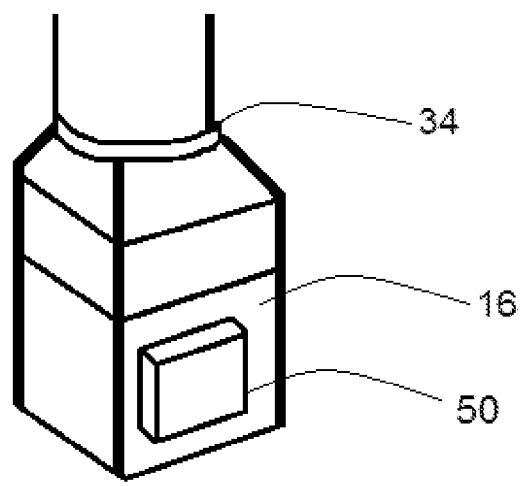
FIG. 6 is a perspective view of a turbine component in an enclosure of the flow balancing ventilation system.

Referring to FIGS. 1, 2, and 6, a flow balancing ventilation system is generally illustrated with reference numeral 10. The flow balancing ventilation system 10 is configured to route an airflow 12 through a plurality of ventilation ducts 14. The flow balancing ventilation system 10 may be employed in a variety of applications, with one application relating to a turbine system, for example. In one exemplary embodiment, the turbine system includes at least one enclosure 16 housing at least one turbine component 50. It is to be appreciated that the turbine system may include a plurality of enclosures housing various turbine components 50, such as a compressor section, a combustion assembly, a turbine section, an inlet housing and an exhaust system, for example. Numerous other turbine components 50 may be housed within the at least one enclosure 16 for protection from the surrounding environment and conversely to protect the environment from the turbine components 50.

The flow balancing ventilation system 10 includes a ventilation inlet 18 disposed at least partially at an exterior region of the at least one enclosure 16. The ventilation inlet 18 includes an upstream portion 20 and a downstream portion 22, with an outer wall 24 defining a cavity 26 for receiving the airflow 12 that travels throughout the cavity 26 in a main flow direction 28. The ventilation inlet 18, and more specifically the cavity 26 may be formed of numerous geometries of varying cross-sectional areas to provide desired flow characteristics, which will depend on the application of use. One embodiment of the cavity 26 includes a decreasing cross-sectional area in the direction of the main flow direction 28. In such an embodiment, the upstream portion 20 includes a first cross-sectional area that is larger than a second cross-sectional area associated with the downstream portion 22. Proximate the downstream portion 22 of the ventilation inlet 18 is a junction 30 that forms a common inlet for the plurality of ventilation ducts 14. Specifically, each of the plurality of ventilation ducts 14 include a first end 32 and a second end 34, with the first end 32 of each of the plurality of ventilation ducts 14 meeting at the junction 30. The junction 30 is the point where the airflow 12 is diverted from the main flow direction 28 into the plurality of ventilation ducts 14 for routing therein. The plurality of ventilation ducts 14 each route a portion of the airflow 12 to the second end 34 of each of the plurality of ventilation ducts 14, which are typically located within one of the at least one enclosures 16. The routing of the airflow 12 to the at least one enclosure 16 may provide a variety of purposes including, but not limited to, cooling and/or pressurization of the at least one enclosure 16.

The ventilation inlet 18 is configured for receiving the airflow 12 that is supplied from a source, which may be ambient air located proximate the ventilation inlet 18 and/or an airflow supply tank maintained at controlled conditions. Irrespective of the source of the airflow 12, the airflow 12 is typically supplied to the ventilation inlet 18 by a fan or a similar component configured to blow the airflow 12 toward and into the ventilation inlet 18. In the case of initiation of the airflow 12 by a fan, it is to be appreciated that multiple fans are typically present, such as a primary fan, as well as a redundant fan configured to operate in the event of primary fan failure. In an embodiment having a primary fan and a redundant fan, neither fan is typically disposed in a central location, with respect to a centerline 36 of the ventilation inlet 18, such that each fan is disposed at an off-center position. The off-center position of each fan results in asymmetric flow throughout the ventilation inlet 18.

To alleviate unbalanced flow distribution to the plurality of ventilation ducts 14 based on asymmetric flow initiated by the off-center fan positions described above, at least one vane, such as a first vane 38 and a second vane 40 are disposed within the cavity 26 of the ventilation inlet 18 to manipulate the airflow 12 prior to reaching the junction 30 and prior to introduction into the plurality of ventilation ducts 14. Both the first vane 38 and the second vane 40 may be formed of numerous geometries and positioned at numerous locations within the cavity 26 of the ventilation inlet 18. In one embodiment, the first vane 38 is formed in a relatively curved or arc-like manner and extends from a first vane upstream end 42 disposed proximate the upstream portion 20 of the ventilation inlet 18 to a first vane downstream end 44. The length of the first vane 38 may vary and in one exemplary embodiment, the length is about 600 mm. The radius of curvature of the first vane 38 may also vary based on the particular application and flow characteristics of the airflow 12, but in one embodiment the first vane 38 may be shaped to include a radius of curvature of about 800 mm to about 1400 mm, with one exemplary embodiment having a radius of curvature of about 1200 mm.

The second vane 40 is also disposed proximate the upstream portion 20 of the ventilation inlet 18 and, similar to the first vane 38, includes a second vane upstream end 46 and a second vane downstream end 48. The length of the second vane 40 is typically similar to that of the first vane 38, however, it is to be appreciated that all dimensions and positioning of the first vane 38 and the second vane 40 may vary and will be constructed to accommodate the application of use. For example, the plurality of ventilation ducts 14 may be arranged in numerous configurations, such that providing a balanced flow by manipulating the airflow 12 with the first vane 38 and the second vane 40 requires specific and varying geometric and dimensional configurations of the first vane 38 and the second vane 40 to achieve the balanced flow of the airflow 12. The second vane 40 is a relatively planar member that is disposed at an angle to the main flow direction 28 of the airflow 12 throughout the cavity 26 of the ventilation inlet 18. In one embodiment, the angle may range from about 20 degrees to about 40 degrees.

As described above, the positioning and geometry of the first vane 38 and the second vane 40 is based on the flow characteristics of the airflow 12 which is determined in large part by the positioning of the flow initiators, such as the primary and redundant fan, as well as the alignment of the plurality of ventilation ducts 14 to which the airflow 12 is being supplied.

It is also to be appreciated that although the preceding description refers to an embodiment comprising both the first vane 38 and the second vane 40, it is contemplated that only one of the first vane 38 and the second vane 40 may be present. Similarly, a greater number of vanes of distinct or similar construction as that of the first vane 38 or the second vane 40 may be included.

Figure 3:
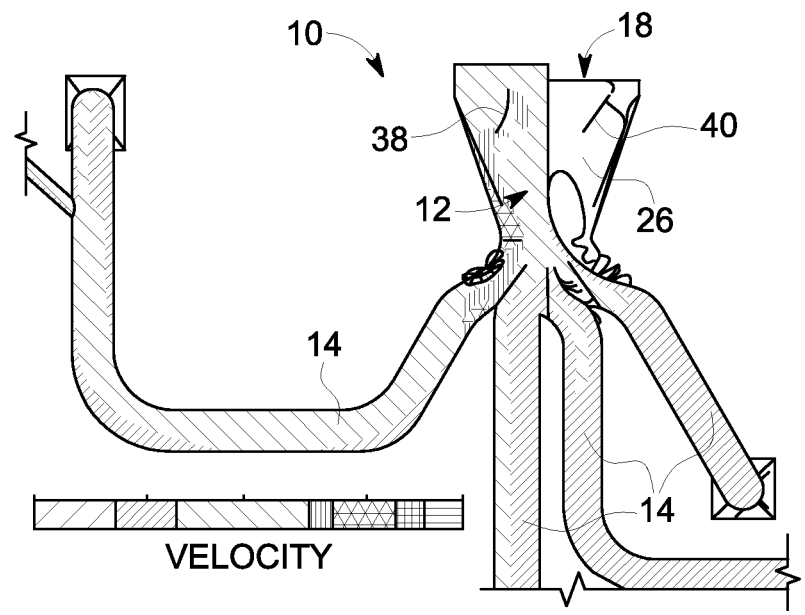
FIG. 3 illustrates a computer analysis model of the flow balancing ventilation system during operation of a first airflow source.
Figure 4:
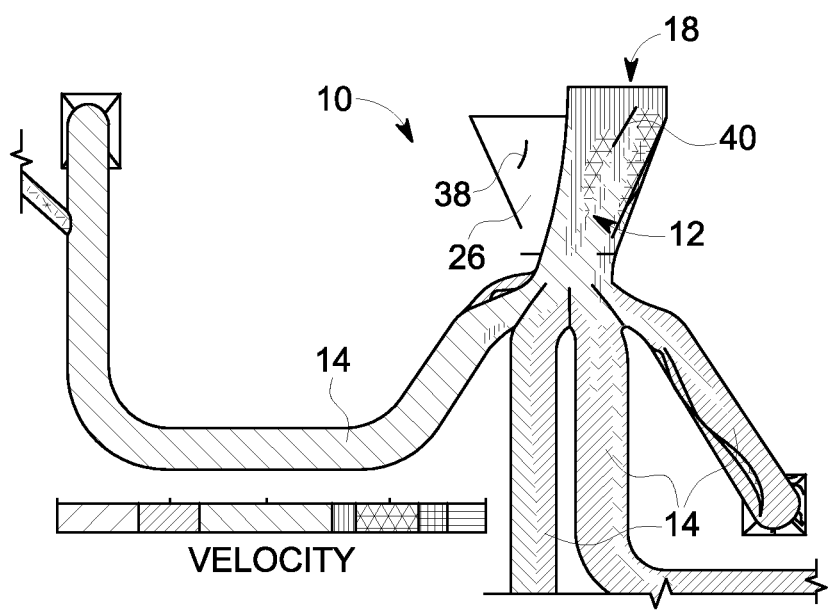
FIG. 4 illustrates a computer analysis model of the flow balancing ventilation system during operation of a second airflow source.

Referring now to FIGS. 3 and 4, computer model analysis illustrates operation of the flow balancing ventilation system 10 during use of the primary fan (FIG. 3) and the redundant fan (FIG. 4). It is observed that the first vane 38 and the second vane 40 influence the airflow 12 by redirecting and/or restricting the airflow 12 to result in a pressure drop within the cavity 26 of the ventilation inlet 18. The resulting pressure drop provides a balancing of the airflow 12 to generate a desirable distribution of the airflow 12 to the plurality of ventilation ducts 14 regardless of whether the primary fan or the redundant fan is initiating the airflow 12.

Figure 5:
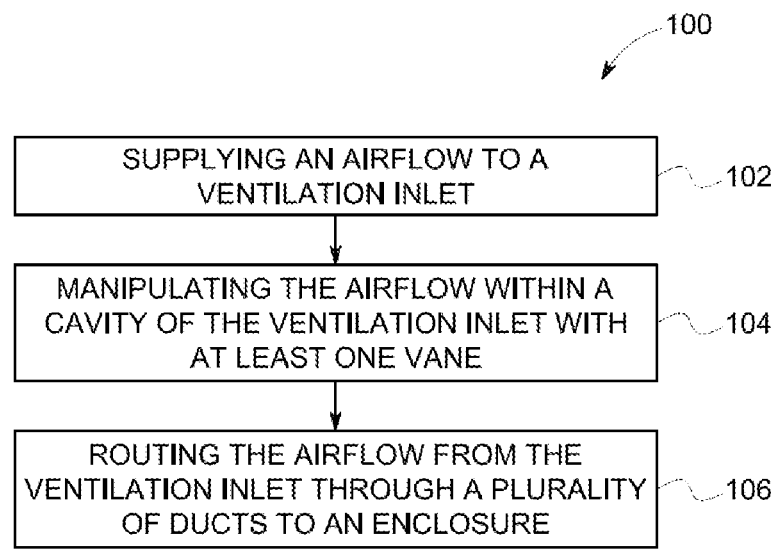
FIG. 5 is a flow diagram illustrating a method of balancing a flow within the flow balancing ventilation system.

As illustrated in the flow diagram of FIG. 5, and with reference to FIGS. 1-4, a method of balancing a flow within a ventilation system 100 is also provided. The flow balancing ventilation system 10 and associated components have been previously described and specific structural components need not be described in further detail. The method of balancing a flow within a ventilation system 100 includes supplying an airflow to a ventilation inlet 102. The airflow is manipulated within a cavity of the ventilation inlet with at least one vane 104 to impose a pressure drop within the cavity 26. The airflow is subsequently routed from the ventilation inlet through a plurality of ducts to an enclosure 106.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flow balancing ventilation system comprising:
a ventilation inlet for receiving an airflow, the ventilation inlet having a cavity defined by an outer wall;
a plurality of ventilation ducts each having a first end and a second end, the first end of each of the plurality of ventilation ducts disposed in operable communication with the ventilation inlet for receiving the airflow, the second end of each of the plurality of ventilation ducts is disposed at least partially within an enclosure; and
at least one vane disposed within the cavity of the ventilation inlet for manipulating the airflow proximate the first end of each of the plurality of ventilation ducts,
wherein the at least one vane includes an arcuate surface profile, and
wherein the at least one vane is immobile relative to the cavity of the ventilation inlet.

2. The flow balancing ventilation system of claim 1, further comprising a second vane disposed within the cavity of the ventilation inlet, the second vane having a relatively planar geometry.

3. The flow balancing ventilation system of claim 2, wherein the second vane is disposed at an angle relative to a main flow direction of the airflow.

4. The flow balancing ventilation system of claim 3, wherein the angle ranges from about 20 degrees to about 40 degrees.

5. The flow balancing ventilation system of claim 1, wherein the cavity includes an upstream portion having a first cross-sectional area and a downstream portion having a second cross-sectional area, wherein the first cross-sectional area is greater than the second cross-sectional area.

6. The flow balancing ventilation system of claim 5, wherein the downstream portion comprises a junction for the first end of each of the plurality of ventilation ducts.

7. A flow balancing ventilation system for a turbine system comprising:
- at least one turbine system enclosure housing at least one turbine system component;
- a ventilation inlet for receiving an airflow, the ventilation inlet disposed at an exterior location of the at least one turbine system enclosure;
- a plurality of ventilation ducts each having a first end and a second end, the first end of each of the plurality of ventilation ducts disposed in operable communication with the ventilation inlet for receiving the airflow, the second end of each of the plurality of ventilation ducts disposed at least partially within the at least one turbine system enclosure;
- a cavity defined by an outer wall of the ventilation inlet including an upstream portion having a first cross-sectional area and a downstream portion having a second cross-sectional area, wherein the first cross-sectional area is greater than the second cross-sectional area, wherein the downstream portion comprises a junction between the first end of each of the plurality of ventilation ducts;
- a first vane disposed within the cavity; and
- a second vane disposed within the cavity,
- wherein the first vane and the second vane each have an upstream end disposed proximate the upstream portion of the ventilation inlet, and
- wherein the first vane and the second vane are immobile relative to the cavity.

8. The flow balancing ventilation system for a turbine system of claim 7, wherein the first vane includes an arcuate surface profile.

9. The flow balancing ventilation system for a turbine system of claim 7, wherein the second vane comprises a relatively planar geometry.

10. The flow balancing ventilation system for a turbine system of claim 9, wherein the second vane is disposed at an angle relative to a main flow direction of the airflow.

11. The flow balancing ventilation system for a turbine system of claim 10, wherein the angle ranges from about 20 degrees to about 40 degrees.

12. A method of balancing a flow within a ventilation system comprising:
- supplying an airflow to a ventilation inlet;
- manipulating the airflow within a cavity of the ventilation inlet with at least one vane,
- wherein the at least one vane includes an arcuate surface profile, and
- wherein the at least one vane is immobile relative to the cavity of the ventilation inlet; and
- routing the airflow from the ventilation inlet through a plurality of ventilation ducts to an enclosure.

13. The method of claim 12, wherein manipulating the airflow comprises restricting the airflow with the at least one vane, the at least one vane comprising a first vane and a second vane.

14. The method of claim 12, further comprising splitting the airflow into the plurality of ventilation ducts at a junction disposed proximate a downstream portion of the cavity.

15. The method of claim 12, wherein the enclosure houses at least one turbine system component.

16. The method of claim 15, wherein routing the airflow provides a cooling of the at least one turbine system component.

* * * * *